United States Patent
Cho et al.

(10) Patent No.: US 7,680,515 B2
(45) Date of Patent: Mar. 16, 2010

(54) DUAL-MODE RECONFIGURABLE BASE STATION AND SCA-BASED SERVICE MODE SWITCHING METHOD THEREOF

(75) Inventors: Eun-Seon Cho, Daejeon (KR); Yeon-Seung Shin, Daejeon (KR); Jin-Up Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 972 days.

(21) Appl. No.: 11/270,133

(22) Filed: Nov. 9, 2005

(65) Prior Publication Data
US 2006/0128434 A1   Jun. 15, 2006

(30) Foreign Application Priority Data
Dec. 10, 2004   (KR) ............... 10-2004-0104242

(51) Int. Cl.
H04B 1/38   (2006.01)
G06F 15/177  (2006.01)
(52) U.S. Cl. ........................ 455/561; 709/221
(58) Field of Classification Search ............ 455/561, 455/560, 552.1, 515, 419, 420; 370/351, 370/357, 360, 310; 709/221, 222
See application file for complete search history.

(56) References Cited

U.S. PATENT DOCUMENTS 6,091,765 A * 7/2000 Pietzold et al. ............ 375/219
2003/0013450 A1 * 1/2003 Wang et al. ................ 455/442
2006/0052124 A1 * 3/2006 Pottenger et al. ........... 455/515

FOREIGN PATENT DOCUMENTS

KR   100248007    12/1999
KR   1020020097338  12/2002

OTHER PUBLICATIONS

C.K. Kim, et al; "SDR Software Framework For SDR Mobile Platform" The Analysis of Electronic Communication Trends by ETRI, vol. 18, No. 15, pp. 28-36, Oct. 2003.

* cited by examiner

*Primary Examiner*—Nick Corsaro
*Assistant Examiner*—Michael Faragalla
(74) *Attorney, Agent, or Firm*—Ladas & Parry LLP

(57) ABSTRACT

The present invention relates to a service mode switching method based on a software communication architecture (SCA) of a reconfigurable base station system. In an exemplary embodiment of the present invention, first and second service mode software component files are stored and managed by separating the first and second service mode software component files into a common component file used for first and second modes in common and first and second mode individual component files individually used for the first and second modes. When the first mode is established according to an applied request, the first mode individual component file is operated, and the base station in the first mode is operated. When the second mode is established according to another applied request, the operation of the first mode individual component file is stopped.

12 Claims, 7 Drawing Sheets

DUAL-MODE RECONFIGURABLE BASE STATION AND SCA-BASED SERVICE MODE SWITCHING METHOD THEREOF

CROSS-REFERENCE TO RELATED APPLICATION

This application claims priority to and the benefit of Korean Patent Application No. 10-2004-0104242 filed in the Korean Intellectual Property Office on Dec. 10, 2004, the entire contents of which are incorporated herein by reference.

BACKGROUND OF THE INVENTION (a) Field of the Invention

The present invention relates to a service mode switching method in a reconfigurable base station system, and more particularly, relates to a service mode switching method based on a software communication architecture (SCA) of a dual-mode reconfigurable base station system.

(b) Description of the Related Art

A software communication architecture (SCA) has been developed by the joint tactical radio system (JTRS) joint program office (JPO) established for developing the next generation communication system. The SCA uses common object request broker architecture (CORBA) middleware which is an open industry middleware standard, so as to enable integration of heterogeneous hardware and software. That is, the SCA, other than limited to a predetermined system, is formed as an independent system design framework. An SCA-based system is a communication system formed based on a configuration of the SCA. For example, a software defined radio (SDR) system uses the SCA as a software framework standard.

SCA techniques are disclosed in Korean Patent Publication No. 2002-97338 entitled "Resource adapter in SDR system", and are disclosed in a paper entitled "SCA Software Framework for SDR Mobile Platform" in the magazine Electronics and Telecommunications Trends (Vol. 18 No. 5) published in October, 2003.

In addition, the dual-mode reconfigurable base station system is a base station system operating in two modes (e.g., analogue and digital modes). Accordingly, the base station may use a digital terminal and an analogue terminal since the base station operates both systems. In such a dual-mode reconfigurable base station, a service mode switching operation should be appropriately performed from a current first mode to a second mode.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a service mode switching method in a dual-mode reconfigurable base station system based on a software communication architecture (SCA), so that a component used for two service modes may be used by one download operation and the service modes may be efficiently converted to each other.

In an exemplary service mode switching method in a dual-mode reconfigurable base station system based on a software communication architecture (SCA) according to an embodiment of the present invention, a) first and second service mode software component files are separated into a common component file used for first and second modes in common and first and second mode individual component files individually used for the first and second modes, and the separated first and second service mode software component files are stored, b) the common component file is operated when the reconfigurable base station system is initialized, c) the base station is operated in the first mode by operating the first mode individual component file when the first mode is established according to an applied request, d) an operation of the first mode individual component file is stopped when the second mode is established according to another applied request; and e) the base station system is operated in the second mode by operating the second mode individual component file.

In a further embodiment, an exemplary dual-mode reconfigurable mode base station system operating in a first or a second mode according to an applied request, coupled to a user terminal through an wireless network, and coupled to a base station manager through an Ethernet includes an RF subsystem, a base band subsystem, and a base station interaction subsystem. The RF subsystem includes at least one first processor for performing wireless communication with the user terminal. The base band subsystem includes at least one second processor for performing wireless traffic call processes. The base station interaction subsystem includes a base station controller for controlling internal communication and operation of the base station, and performing a dual-mode system reconfiguration. The base station manager stores first and second service mode software component files being separated into a common component file used for first and second modes in common, and first and second mode individual component files individually used for the first and second modes. In this case, the base station controller downloads the common component file and an established mode individual component file from the base station manager, and selectively downloads the individual component file to the first or second processor.

DETAILED DESCRIPTION OF THE EMBODIMENTS

With reference to the accompanying drawings, an embodiment of the present invention will be described in order for those skilled in the art to be able to implement the invention. As those skilled in the art would realize, the described embodiment may be modified in various different ways, all without departing from the spirit or scope of the present invention.

A system fully using a software communication architecture (SCA) based software framework has not been yet launched, and the SCA based software framework is partly applied to a system. In particular, the SCA does not provide a standard of components as software constituent elements, a standard of packages for software arrangement, or a standard for arrangement environment and processes. In addition, the SCA standard does not provide a standard for software component technology, or a mechanism for storing and managing component files capable of arrangement and conversion.

Accordingly, hereinafter, a service mode switching method in a dual-mode reconfigurable base station system (RBS) having an SCA-based software configuration according to an exemplary embodiment of the present invention will be described. The exemplary embodiment of the present invention may be applied to systems having the SCA configuration, and may be applied to a multi-standard base station.

In the exemplary embodiment of the present invention, software components are packaged to be managed for each operation mode of a base station system, and components commonly used at each operational mode are installed by a one-time download and therefore reuse of the components may be maximized without duplicate downloading. Here, the components are constituent elements for forming the software capabilities, and the constituent elements are capable of arrangement and conversion. In addition, a mode switching operation is quickly performed since unnecessary downloading is eliminated by gradually performing the download, and a startup file is arranged by an SCA-based extensible Markup Language (XML) file.

Figure 1:
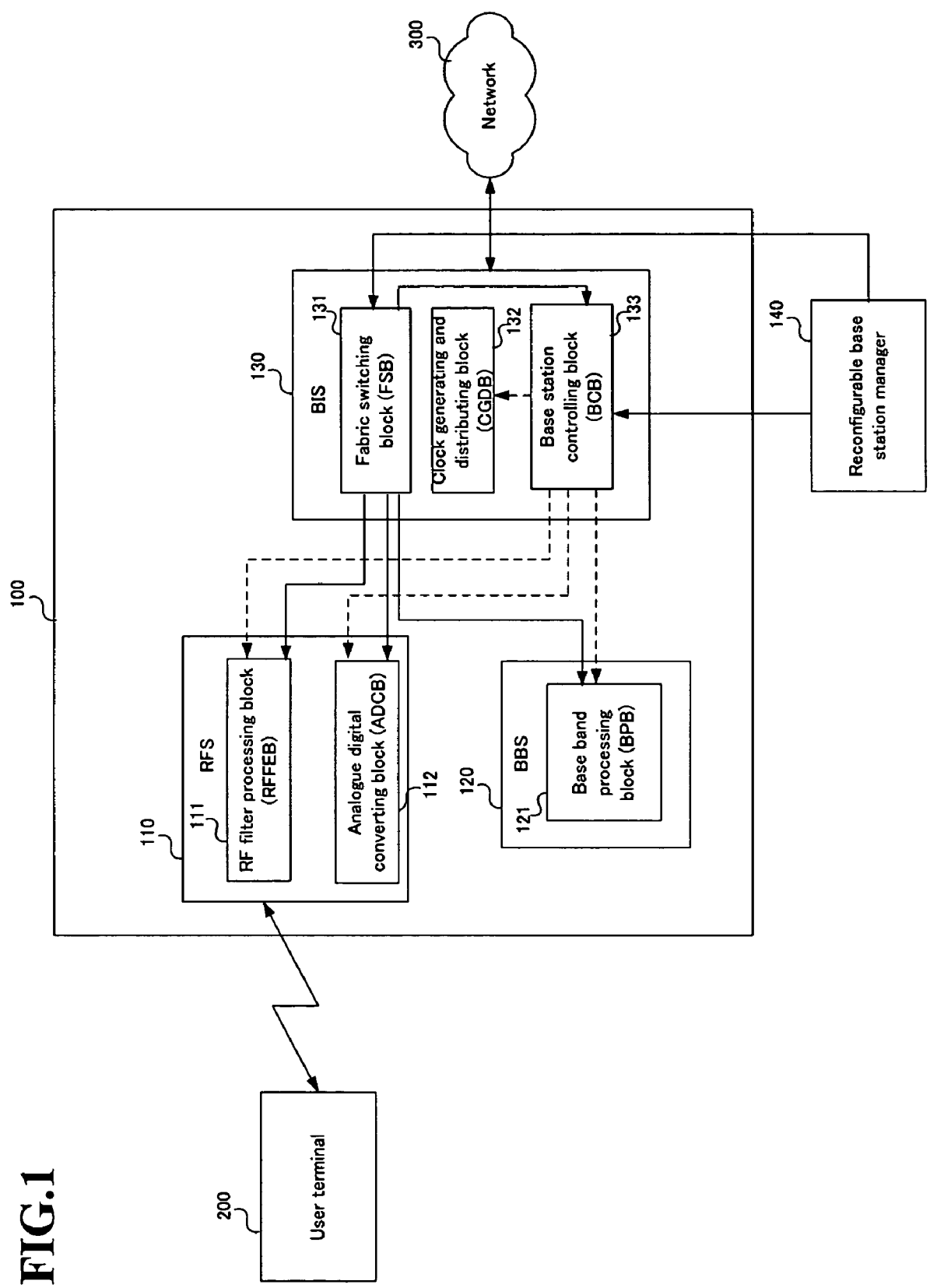
FIG. 1 shows a diagram of a configuration of a dual-mode reconfigurable base station system according to an exemplary embodiment of the present invention.

FIG. 1 shows a diagram of a configuration of the dual-mode reconfigurable base station system according to an exemplary embodiment of the present invention.

As shown in FIG. 1, a dual-mode reconfigurable base station system 100 according to the exemplary embodiment of the present invention includes a radio frequency subsystem (RFS) 110, a base band subsystem (BS) 120, and a base station interconnection subsystem (BIS) 130. The dual-mode reconfigurable base station system 100 is coupled to a user terminal 200 at one side of the dual-mode reconfigurable base station system 100 to perform wireless communication, and is coupled to a network 300 at another side thereof to perform wire communication. In addition, a reconfigurable base station manager (RBSM) 140 for controlling system maintenance, system reconfiguration, and user interface is coupled to the dual-mode reconfigurable base station system 100 through an Ethernet. The reconfigurable base station manager 140 may be separately formed from the dual-mode reconfigurable base station system 100 according to the exemplary embodiment of the present invention, or may be formed in the dual-mode reconfigurable base station system 100.

The RF subsystem 110 performs the wireless communication with the terminal 200, and more specifically, the RF subsystem 110 includes an RF front end block (RFFEB) 111 formed as hardware to perform RFS functions relating to wireless frequency, and a analogue digital converting block (ADCB) 112 for converting an analogue signal to a digital signal. The RF front end block (RFFEB) and the analogue digital converting block (ADCB) may be referred to as a first processor.

The base band subsystem 120 performs wireless traffic call processes, and includes a base band processing block (BPB) 121 for performing a software modem function realizing an existing hardware modem as software, and performing traffic process and control functions. The base band processing block (BPB) 121 may be referred to as a second processor.

The base station interconnection subsystem 130 performs base station clock management, base station internal communication, and general control and management functions. In further detail, the base station interconnection subsystem 130 includes a fabric switching block (FSB) 131 for performing internal base station gigabit Ethernet communication, a clock generating and distributing block (CGDB) 132 for generating and distributing a base station clock signal, and a base station controlling block (BCB) 133 for performing maintenance and reconfigurable system reconfiguration functions.

The reconfigurable base station system 100 as described above will be described in relation to components for respective software functions.

Figure 2:
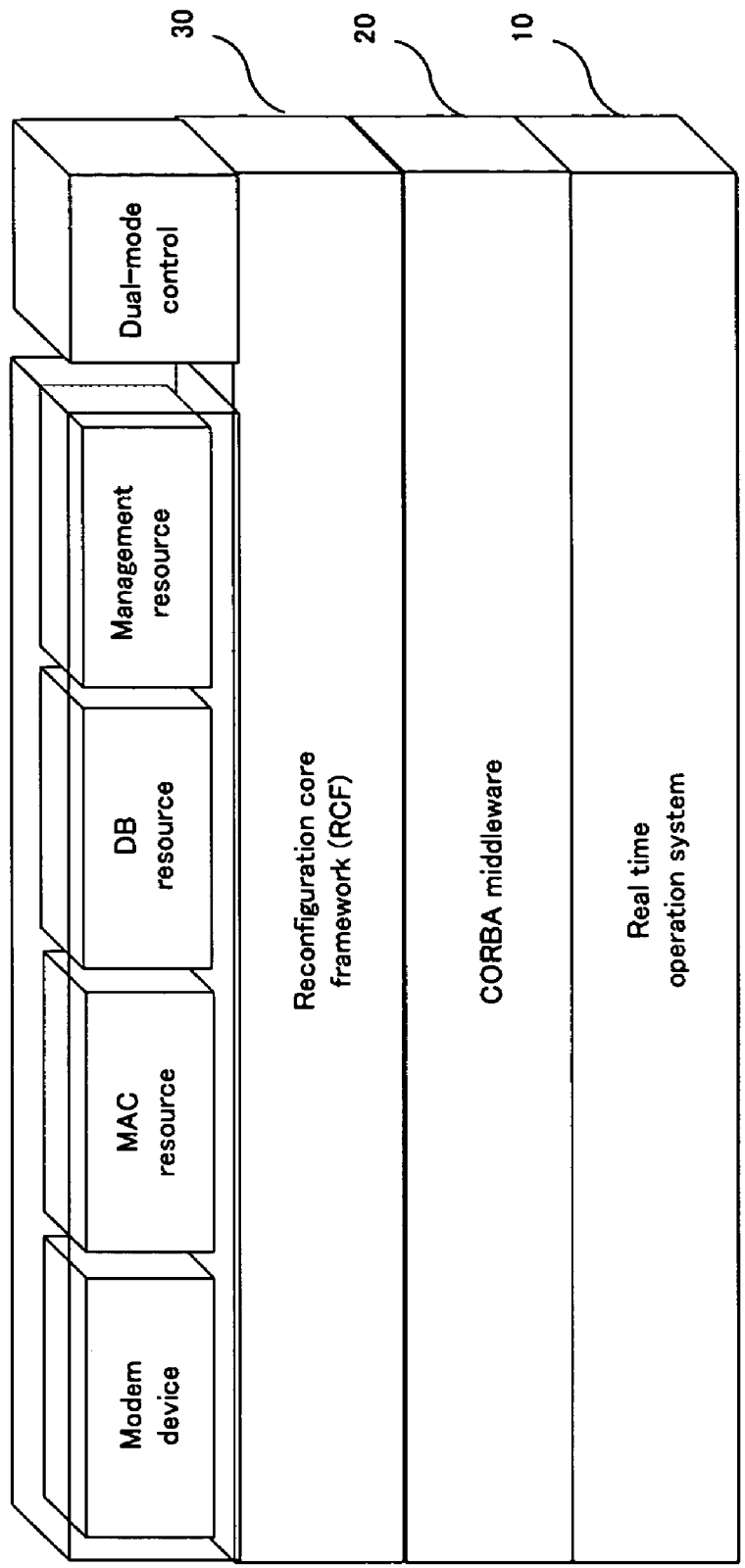
FIG. 2 shows a system layout view of the dual-mode reconfigurable base station system in relation to software functions according to the exemplary embodiment of the present invention.

FIG. 2 shows a system layout view of the dual-mode reconfigurable base station system in relation to components for software functions according to the exemplary embodiment of the present invention. FIG. 2 specifically shows a software configuration in the base station controlling block 133, and first and second mode base station software packages formed in a configuration shown in FIG. 2 are arranged in the base station controlling block 133.

As shown in FIG. 2, a software configuration of the SCA based system includes a basic real time operation system (RTOS) 10 and CORBA middleware 20 defined by the SCA standard.

While the real time operation system 10 is arranged in the respective subsystems 110 to 130, the CORBA middleware 20 is provided for the base station controlling block 133 in the base station interconnection subsystem 130. A reconfiguration core framework (RCF) 30 based on the SCA is arranged on the CORBA middleware 20 to support system reconfiguration. The reconfiguration core framework includes a domain manager for performing application registration/deregistration and generating a file manager, a device manager for managing a device, and the file manager for managing a file system.

A method for gradually downloading base station software will be described based on the above configuration.

Figure 3:
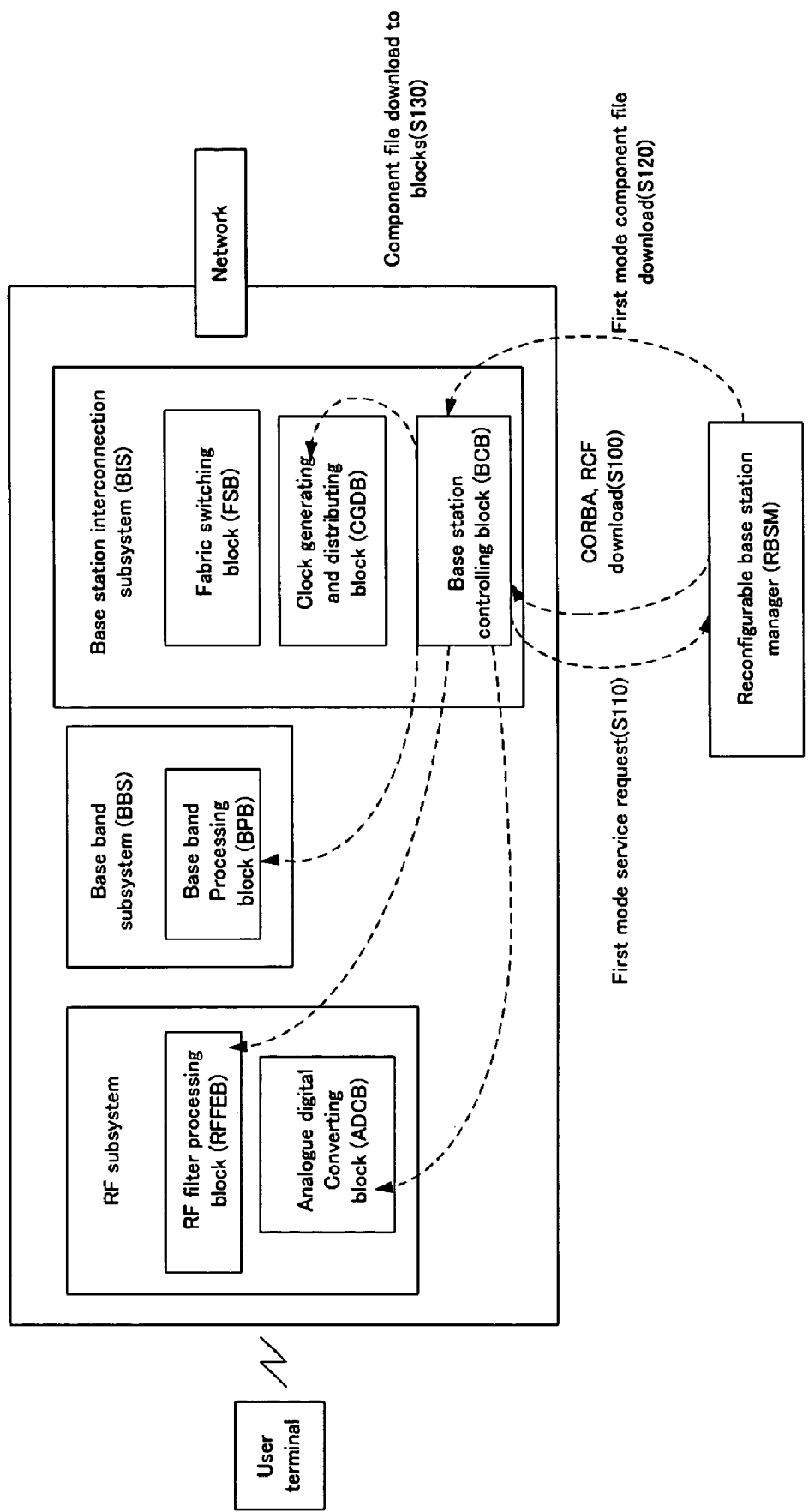
FIG. 3 shows a diagram for representing operations performed between constituent elements shown in FIG. 1 when base station software is downloaded according to the exemplary embodiment of the present invention.

FIG. 3 shows a diagram for representing operations performed between constituent elements of the dual-mode reconfigurable base station system 100 shown in FIG. 1 when base station software stored and managed by the reconfigurable base station manager 140 is downloaded to the respective subsystems 110, 120, and 130.

Differing from other systems, since a hard disk is installed in the base station controlling block 133, a base station software download is performed in two steps. A first software download is performed from the reconfigurable base station manager 140, and a second software download is performed to the respective blocks.

Figure 4:
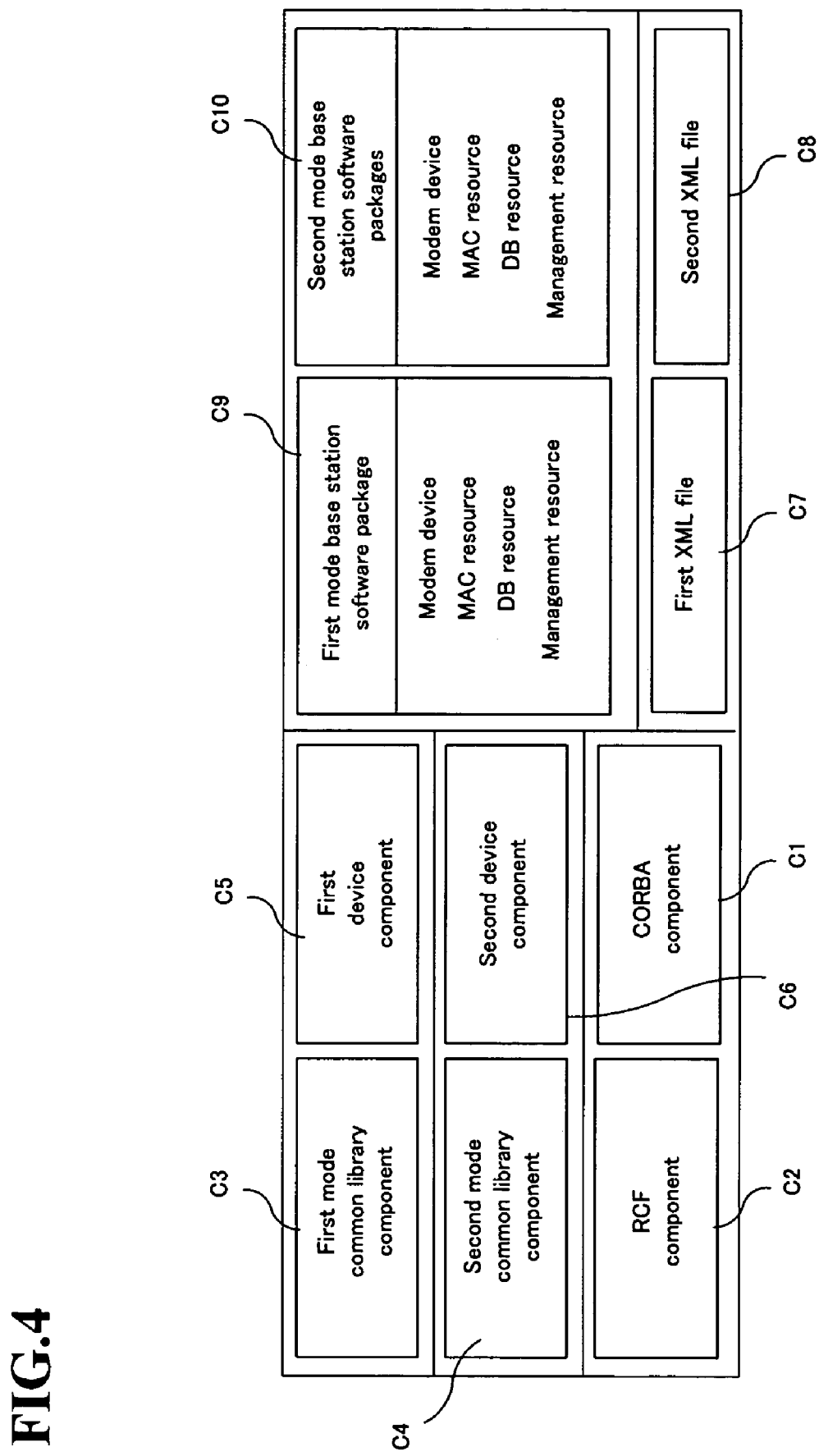
FIG. 4 shows a diagram representing a configuration of the base station software stored and managed by a base station manager according to the exemplary embodiment of the present invention.

In the reconfigurable base station manager 140, the base station software is stored and managed for first and second modes. FIG. 4 shows a diagram representing a configuration of the base station software stored and managed by a base station manager according to the exemplary embodiment of the present invention. As shown in FIG. 4, the reconfigurable base station manager 140 stores a CORBA component C1 and an RCF component C2 used for the first and second modes in common, first and second mode common library components C3 and C4, first and second device components C5 and C6, first and second XML files C7 and C8, and base station software packages C9 and C10 for the first and second modes.

The common library components C3 and C4 are used to execute the device component and application component XML file, and are independently performed in the device and the application so that device and application references may be received to perform corresponding operations. For example, the common library components C3 and C4 may include an XML data parser component for executing the application component, a download component for component file download, a file manager, a service component for providing a log service to each component, and a domain manager component. In the exemplary embodiment of the present invention, the common library components C3 and C4 include a library used in common for the first and second device components C5 and C6 and the first and second XML files C7 and C8, so as to efficiently form the components as modules. Accordingly, the minimum number of downloads is performed when the device components C5 and C6 and the XML files C7 and C8 are upgraded.

The device components C5 and C6 are used to operate devices, and include logical device components, a device manager component for generating and canceling the logical device components, and a device XML data component including device setting information for generating the device by the device manager and device component information.

The XML files C7 and C8 are application components used to operate an application program, and include an application XML data component and an interface component for a user and an operator.

Here, the CORBA component C1 and RCF component C2 may be referred to as common component files, and the components C3 to C10 may be respectively referred to as corresponding mode individual component files.

Referring back to FIG. 3, the reconfigurable base station manager 140 downloads the CORBA component C1 and the RCF component C2 to the base station controlling block 133 of the base station interconnection subsystem 130, and operates the base station controlling block 133 in step S100 when respective operation system (OS) booting operations at initialization of the dual-mode reconfigurable base station system 100 are finished at the respective blocks.

When an operator requests to start the first mode service in step S120, the reconfigurable base station manager 140 performs a first download for downloading the first mode component files to the hard disk of the base station controlling block 133 in step S130. Then, the base station controlling block 133 performs a second download for allocating the downloaded first mode component file to the respective blocks in step S140.

By the first and second download, the respective mode component files are allocated to the dual-mode reconfigurable base station system 100.

A service mode switching method of the dual-mode reconfigurable base station system based on the SCA will be described with reference to the above downloading method.

Figure 5A:
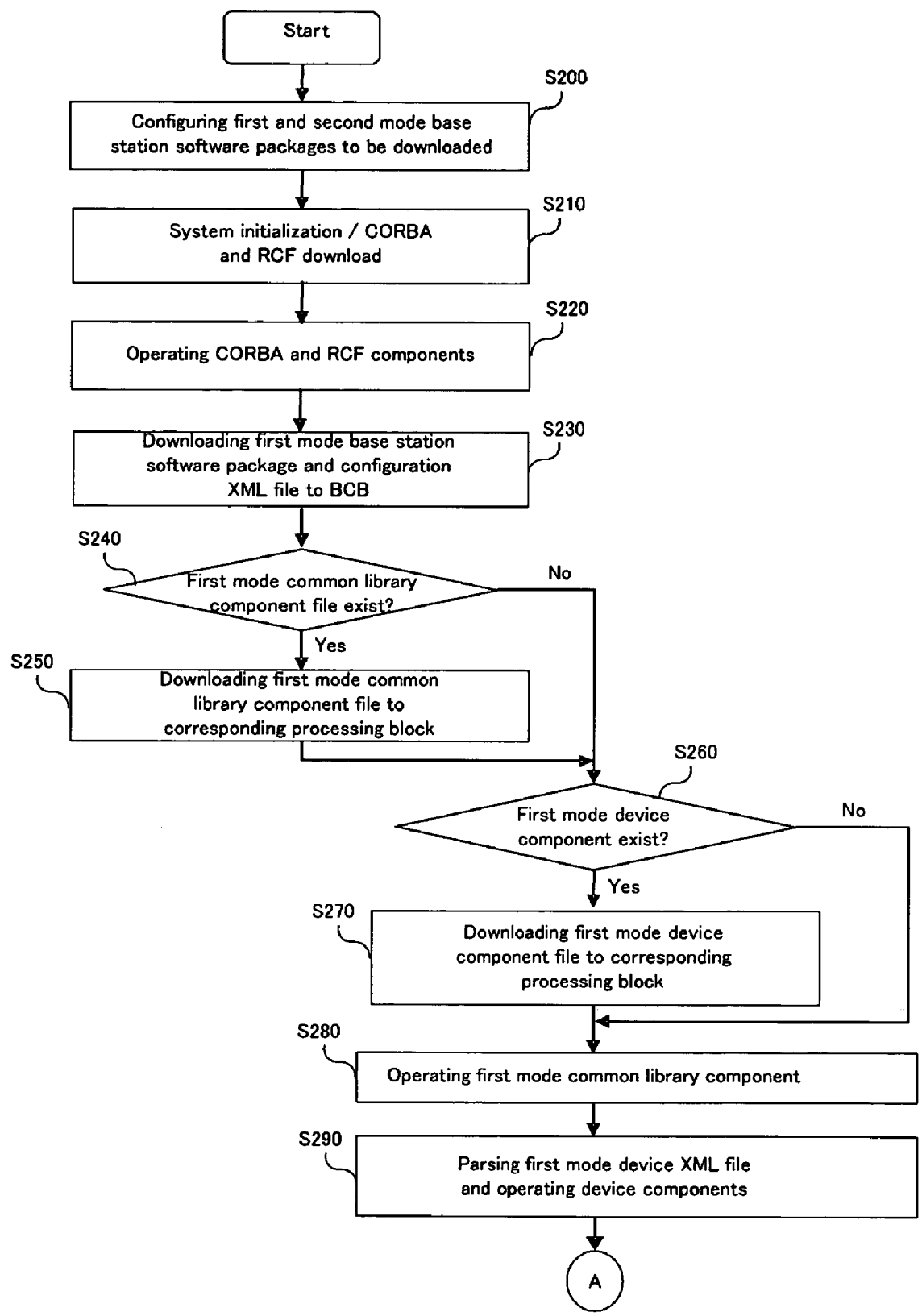
FIG. 5A to FIG. 5C show flowcharts for respectively representing service mode switching operations according to the exemplary embodiment of the present invention.
Figure 5B:
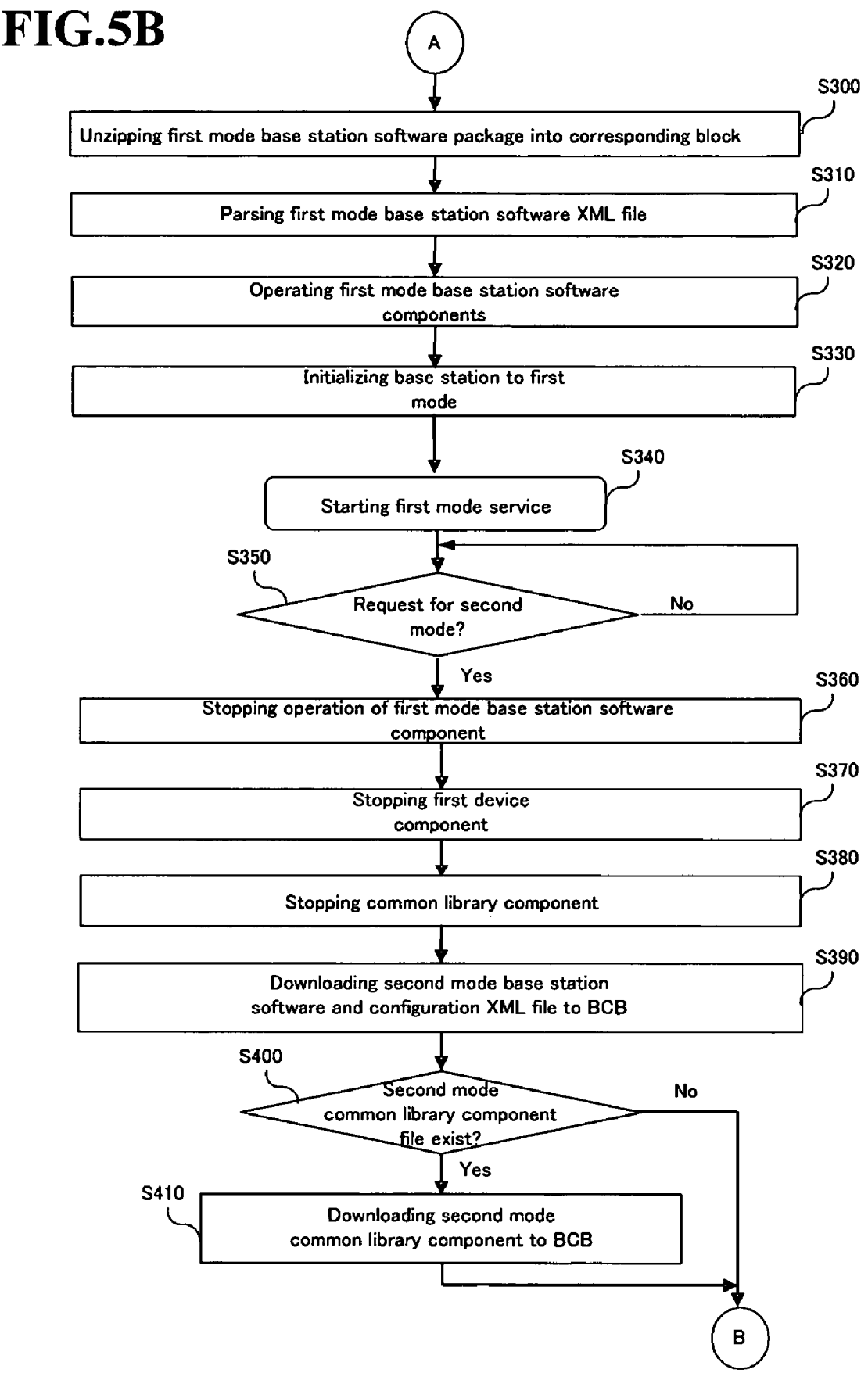
Figure 5C:
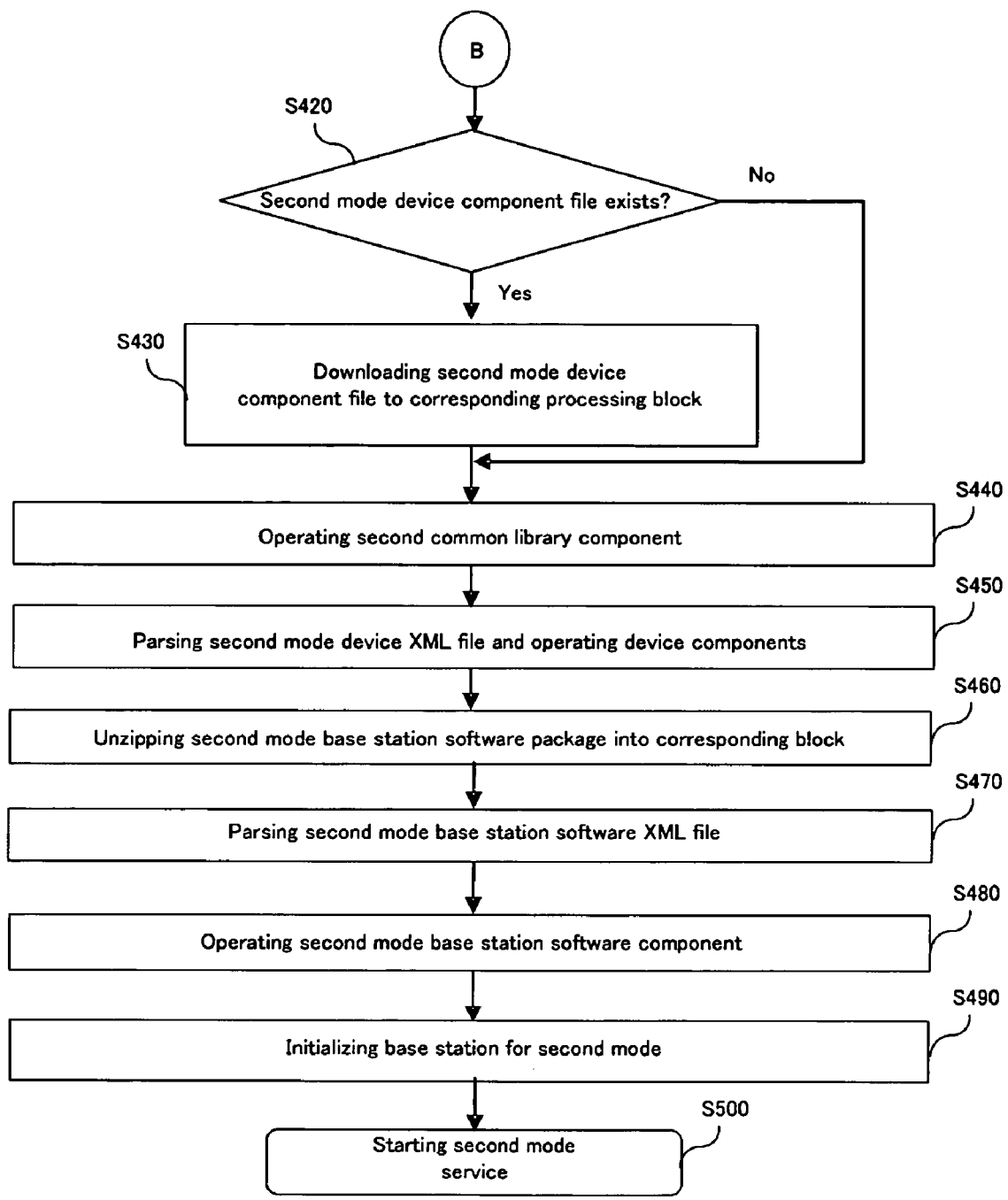

FIG. 5A to FIG. 5C show flowcharts for respectively representing service mode switching operations according to the exemplary embodiment of the present invention.

As shown in FIG. 5A, in the reconfigurable base station system 100 based on the SCA, the reconfigurable base station manager 140 stores the first and second mode base station software packages to be downloaded as shown in FIG. 4 in step S200. At this time, the first and second mode base station software packages are formed for the respective modes and functions. In addition, when the base station system is initialized, the reconfigurable base station manager 140 downloads the CORBA and RCF components C1 and C2 to the base station controlling block 133 so as to manage communication and reconfiguration between the components, and operates the CORBA and RCF components C1 and C2 in steps S210 to S220.

The reconfigurable base station manager 140 downloads the first mode base station software package C9 and a configuration XML file among the XML files C7 to the base station controlling block 133 in step S230 so as to operate the dual-mode reconfigurable base station system 100 in the first mode. In addition, the common library component file C3 is downloaded to a corresponding processing block in steps S240 and S250 when there is the first mode common library component file. In a like manner, the first mode device component file is downloaded to a corresponding processing block in steps S260 and S270 when there is the first mode device component. As described, after the first mode software component files are downloaded from the reconfigurable base station manager 140 to the base station controlling block, the component files are downloaded to the respective blocks 111, 112, 121, and 132 of the respective subsystems 110 to 130 by the control of the base station controlling block 133.

The respective blocks operate the downloaded common library component C3, and operate the necessary device components by parsing the first mode device XML file C7 among the XML files in steps S280 and S290.

Once the first mode device component C5 is operated, as shown in FIG. 5B, the first mode base station software package C9 for operating as an application on the device is unzipped to the corresponding block in step S300, and the first mode base station software XML file C7 is parsed in step S310 so as to allocate the components to corresponding positions and operate the components. In addition, the base station software components required for the first mode are operated in step S320.

When the component files for the first mode are successfully operated as described above, a state table and a configuration table are updated, the base station is initialized for the first mode in step S330, and therefore a service for the first mode starts in step S340.

When the base station operates in the first mode and a request for the second mode is received from the user in step S350, the base station controlling block 133 stops an operation of the first mode base station software component and all the application software C7 and C9 relating the first mode in step S360. When the application software is successfully stopped, the base station controlling block 133 sequentially stops the first mode device component C5 and the common library component C3 in steps S370 to S380.

When the components for the first mode are finished, the reconfigurable base station manager 140 downloads the second mode base station software and configuration XML file C10 and C8 to the base station controlling block 133 in step S390. At this time, since the CORBA component C1 and the RCF component C2 used for the first and second modes have been downloaded and operated, it is not required to additionally download the CORBA component and the RCF component when the first mode is converted into the second mode.

In addition, the second mode component are downloaded and operated in a like manner of the first mode in steps S230 to S320. The common library component file C4 is downloaded to the base station controlling block 133 in steps S400 to S410 when there is the second mode common library component file. As shown in FIG. 5C, the second mode device component file C6 is downloaded to a corresponding processing block when there is the second mode device component file in steps S420 and S430. In addition, the downloaded second mode software component files are downloaded to the respective blocks 111, 112, 121, and 132 of the respective subsystems 110 to 130 by the control of the base station controlling block 133.

Then, the respective blocks operate the downloaded library component C4, and operate the necessary device components by parsing the second mode device XML file C8 in steps S440 and S450. Once the device component is operated, the second mode base station software package for operating as application on the device is unzipped to the corresponding block in step S460, and the configuration XML file is parsed in step S470 so as to operate the required base station software components in step S480. When the component files are successfully operated, the base station is initialized for the second mode in step S490, and therefore a service for the second mode starts in step S500.

The above method may be realized as a program recorded in a computer-readable recording medium. Various kinds of recoding devices may be used for the recording medium if the recoding devices are readable on a computer. For example, a CD-ROM, magnetic tape, or a floppy disk may be used for the recoding medium, and the recoding medium may be realized in a carrier wave type (e.g., transmission through the Internet).

According to the exemplary embodiment of the present invention, the component files for realizing the SCA based system are classified for the service modes and the functions, so that the component files are efficiently stored, managed, and arranged.

In addition, the component file is gradually downloaded according to characteristics of the base station system having a hard disk, and the number of unnecessary downloading operations is reduced since the common component used for the first and second modes in common is downloaded once.

Further, a stable and quick mode switching operation may be performed since the base station software is formed as the component and is appropriately arranged, and the system is reconfigured.

In addition, a minimum number of download operations may be performed when the device component and application are upgraded, since the library used for the device component and application in common is included in the common library component. Therefore, the time for downloading may be reduced.

Also, when the mode of the device and application is converted, the time for reconfiguring the system is reduced since the device component and application download for a corresponding mode are performed while the common library component has been operated.

Accordingly, the SCA based system may be optimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A service mode switching method in a dual-mode reconfigurable base station system (RBSS) based on a software communication architecture (SCA), the method comprising:
    a) driving a common component file (CCF) from a reconfigurable base station manager (RBSM) through an ethernet connection to the RBSS such that the CCF is installed only once into the RBSS, wherein the CCF comprises a common portion of first and second service mode software ($1^{st}$ SMS and $2^{nd}$ SMS, respectively);
    b) operating the RBSS in a first mode by using the once installed CCF and by downloading and using a non-common portion of the $1^{st}$SMS, which is non-common with the $2^{nd}$SMS, in the RBSS from the RBSM through the ethernet connection when the first mode is initiated by a first mode applied request;
    c) stopping the RBSS operating in the first mode when a second mode applied request initiates the RBSS in a second mode; and
    d) driving and operating the RBSS in the second mode by using the once installed CCF and by downloading and using a non-common portion of the $2^{nd}$SMS, which is non-common with the $1^{st}$SMS, into the RBSS from the RBSM through the ethernet connection when the second mode is initiated by a second mode request.

2. The service mode switching method of claim 1, wherein the CCF comprises:
    a common object request broker architecture (CORBA) component, and
    a reconfiguration framework (ROE) component; and
  the non-common portion of the $1^{st}$SMS comprises:
    a first mode device component file,
    a first mode device XML file,
    a first mode common library component file formed by a first mode library used for the first mode device component file and the first mode XML file, and
    a first mode base station software package.

3. The service mode switching method of claim 2, wherein b) or d) comprises:
    driving first mode common library component file, parsing the first mode device XML file from among XML files, and driving predetermined device components of the RBSS in accordance to the first mode
    decompressing the first mode base station software package into a corresponding directory when the predetermined device components of the RBSS are driven in the first mode; and
    parsing a base station software XML file from among XML files, and driving first mode base station software components required for the first mode.

4. The service mode switching method of claim 2, wherein c) comprises,
    stopping an operation of the first mode base station software components driven in the first mode when the second mode is initiated;
    stopping an operation of the base station software XML file driven in the first mode;
    stopping an operation of the first mode device component file; and
    stopping an operation of the first mode common library component file.

5. A dual-mode reconfigurable base station system (RBSS) operating and switching between a first mode or a second mode in accordance to respective first and second mode applied requests, the RBSS coupled to a user terminal through a wireless network and coupled to a reconfigurable base station manager (RBSM) through an Ethernet, the RBSS comprising:
    an RF subsystem comprising at least one first processor for performing wireless communication with the user terminal;
    a base band subsystem comprising at least one second processor for performing wireless traffic call processes; and
    a base station interaction subsystem comprising a base station controller (BSC) for controlling internal communication within the RBSM for controlling the RBSS in a first mode RBSS, for controlling the RBSS in a second mode, and for performing a dual-mode system reconfiguration of the RBSS, wherein the RBSM stores a common component file (CCF) which comprises a common portion of first and second service mode software ($1^{st}$SMS and $2^{nd}$SMS, respectively) which is commonly used for both the first and second modes, the RBSM also stores a non-common portion of the $1^{st}$SMS which is non-common with the $2^{nd}$SMS In which the non-common portion of the $1^{st}$SMS is used along with the CCF to control the RBSS in the first mode, and the RBSM also stores a non-common portion of the $2^{nd}$SMS which is non-common with the $1^{st}$SMS in which the non-common portion of the $2^{nd}$SMS is used along with the CCF to control the RBSS in the second mode; and the BSC downloads and installs the CCF only once from the RBSM, the BSC downloads and installs the non-common portion of the first service mode software to use along with the once installed CCF to drive the RBSS in the first mode when the first mode applied request is initiated by the user terminal, the BSC downloads and installs the non-common portion of the second service mode software to use along with the once installed CCF to drive the RBSS in the second mode when the second mode applied request is initiated by the user terminal.

6. The RBSS of claim 5, wherein: the BSC receives only once the downloaded CCF.

7. The RBSS of claim 5, wherein CCF comprises
at least a common object request broker architecture (CORBA) component and
a reconfiguration framework (RCF) component.

8. The RBSS of claim 7, wherein the non-common portion of the $1^{st}$SMS comprise
at least a device component,
an XML file, a common library component formed by a library used for the device component and the XML file in common, and
a base station software package.

9. The RBSS of claim 7, wherein the non-common portion of the $2^{nd}$SMS comprise
at least a device component,
an XML file,
a common library component formed by a library used for the device component and the XML file in common, and
a base station software package.

10. The service mode switching method of claim 1, wherein
the CCF comprises:
a common object request broker architecture (CORBA) component, and
a reconfiguration framework (RCF) component; and
the non-common portion of the $1st^{SMS\ comprises}$:
a second mode device component file,
a second mode device XML file,
a second mode common library component file formed by a second mode library used for the second mode device component file and the second mode XML file, and
a second mode base station software package.

11. The service mode switching method of claim 10, wherein b) or d) comprises:
driving the second mode common library component file, parsing the second mode device XML tile from among XML files, and driving predetermined device components of the RBSS in accordance to the second mode;
decompressing the second mode base station software package into a corresponding directory when the predetermined device components of the RBSS are driven in the second mode; and
parsing a base station software XML file from among XML flies, and driving second mode base station software components required for the second mode.

12. The service mode switching method of claim 10, wherein c) comprises,
stopping an operation of the second mode base station software components driven in the second mode when the second mode is initiated;
stopping an operation of the base station software XML file driven in the second mode;
stopping an operation of the second mode device component second; and
stopping an operation of the second mode common library component file.

* * * * *